US010622616B2

(12) United States Patent
Lee et al.

(10) Patent No.: US 10,622,616 B2
(45) Date of Patent: Apr. 14, 2020

(54) ALL-SOLID STATE BATTERY AND METHOD OF MANUFACTURING THE SAME

(71) Applicant: Hyundai Motor Company, Seoul (KR)

(72) Inventors: Sang Heon Lee, Gyeonggi-do (KR); Hong Seok Min, Gyeonggi-do (KR); Oh Min Kwon, Busan (KR); Yong Sub Yoon, Soeul (KR); Kyung Su Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 228 days.

(21) Appl. No.: 15/356,912

(22) Filed: Nov. 21, 2016

(65) Prior Publication Data

US 2017/0324076 A1    Nov. 9, 2017

(30) Foreign Application Priority Data

May 4, 2016    (KR) .................. 10-2016-0055479

(51) Int. Cl.
| | |
|---|---|
| *H01M 4/04* | (2006.01) |
| *H01M 4/62* | (2006.01) |
| *H01M 10/0525* | (2010.01) |
| *H01M 10/0562* | (2010.01) |
| *H01M 4/133* | (2010.01) |
| *H01M 4/583* | (2010.01) |
| *H01M 10/052* | (2010.01) |
| *H01M 4/36* | (2006.01) |
| *H01M 4/02* | (2006.01) |

(52) U.S. Cl.
CPC ....... *H01M 4/0407* (2013.01); *H01M 4/0435* (2013.01); *H01M 4/133* (2013.01); *H01M 4/362* (2013.01); *H01M 4/583* (2013.01); *H01M 4/623* (2013.01); *H01M 4/624* (2013.01); *H01M 10/052* (2013.01); *H01M 10/0525* (2013.01); *H01M 10/0562* (2013.01); *H01M 2004/021* (2013.01); *H01M 2220/20* (2013.01); *H01M 2300/0068* (2013.01); *Y02E 60/122* (2013.01); *Y02T 10/7011* (2013.01)

(58) Field of Classification Search
CPC .. H01M 4/0407; H01M 4/0435; H01M 4/133; H01M 4/362; H01M 4/583; H01M 4/623; H01M 4/624; H01M 10/052; H01M 10/0525; H01M 10/0562; H01M 2300/0068; H01M 2220/20; H01M 2004/021
See application file for complete search history.

(56) References Cited

U.S. PATENT DOCUMENTS

| 2008/0020283 A1 | 1/2008 | Miyashiro et al. |
| 2013/0209916 A1 | 8/2013 | Kim et al. |

FOREIGN PATENT DOCUMENTS

| JP | 2007-035543 A | 2/2007 |
| JP | 2013-196806 A | 9/2013 |

(Continued)

*Primary Examiner* — Brittany L Raymond
(74) *Attorney, Agent, or Firm* — Mintz Levin Cohn Ferris Glovsky and Popeo, P.C.; Peter F. Corless

(57) ABSTRACT

Disclosed are an all-solid state battery and a method of manufacturing the same. The all-solid state battery includes: a current collector comprising an electrode mixture comprising an active material, a conductive material, a binder, and a nano-solid electrolyte; and a composite electrode comprising microcapsules. The electrode mixture is formed in a slurry and the microcapsules are configured to coat the slurry on the current collector.

6 Claims, 3 Drawing Sheets

(56) References Cited

FOREIGN PATENT DOCUMENTS

| KR | 10-2007-0034104 A | 3/2007 |
|----|-------------------|--------|
| KR | 10-2012-0015964 A | 2/2012 |
| KR | 2015-0013102 A    | 2/2015 |

ALL-SOLID STATE BATTERY AND METHOD OF MANUFACTURING THE SAME

CROSS-REFERENCE TO RELATED APPLICATION

This application is based on and claims the benefit of priority to Korean Patent Application No. 10-2016-0055479, filed on May 4, 2016 in the Korean Intellectual Property Office, the disclosure of which is incorporated herein in its entirety by reference.

TECHNICAL FIELD

The present invention relates to an all-solid state battery and a method of manufacturing the same. Particularly, the all-solid state battery may include a nano-solid electrolyte that is impregnated into pores between an active material and a solid electrolyte.

BACKGROUND

In general, a lithium secondary battery has a structure in which a lithium electrolyte is impregnated into a battery assembly including a cathode containing a transition metal oxide as an electrode active material, an anode containing a carbon based active material, and a separator. The lithium secondary battery as described above has a non-aqueous composition, and in general, an electrode is manufactured by coating electrode slurry on a current collector. For instance, the electrode slurry is prepared by mixing an electrode mixture including an electrode active material for storing energy, a conductive material for imparting electrical conductivity, and a binder for adhering the electrode active material and the conductive material to the current collector and providing binding strength therebetween with a solvent such as N-methyl pyrrolidone (NMP), or the like. As a current collector of a secondary battery, copper foil, aluminum foil, or the like, is generally used.

However, dust, or the like, may be generated due to deterioration of adhesion between the electrode mixture and the current collector in a compression process or subsequent manufacturing process at the time of manufacturing the battery as described above, and the electrode active material attached to a surface can be delaminated in operation of the battery. Deterioration of adhesion and delamination of the active material in accordance therewith as described above increase internal resistance of the battery to deteriorate output characteristics, decrease capacity of the battery, and the like, thereby significantly deteriorating performance of the battery.

Therefore, in order to solve this problem, various methods have been suggested. For example, a method of increasing binding strength with a current collector by etching a surface of an aluminum current collector to form micro unevenness has been reported. This method has an advantage in that it is possible to obtain an aluminum current collector having a high specific surface area by a simple process, but there is a problem in that a cycle life of the aluminum current collector is decreased due to etching treatment.

One of the main causes of generating a delamination phenomenon of a cathode active material in a cathode using a cheap aluminum current collector is formation of a coating such as an aluminum fluoride (AlF) coating, or the like, on a surface of the current collector due to a reaction between a fluorine source of an electrolyte and aluminum of the current collector in an operation voltage of the cathode. Formation of the AlF coating as described above can be accelerated due to an increase in the fluorine source at the time of increasing a temperature of the battery. The AlF coating deteriorates binding strength between the cathode active material and the aluminum current collector, thereby serving to increase resistance of the cathode.

Therefore, it was confirmed that the AlF coating causes delamination of the cathode active material and deteriorates electrical properties of the battery, particularly, a movement speed of electrons from the cathode active material to the current collect, thereby having a negative influence on performance of the battery.

Meanwhile, since an electrolyte solution containing a combustible organic solvent is used in the lithium secondary battery, a severe safety problem may occur at the time of various external impacts and creating a cell-uncontrollable environment, and there is a need to separately use an additional material for improving safety or to mount an additional safety device, in addition to a basic structure of a battery cell.

Therefore, an all-solid state battery in which a solid electrolyte is stacked between a cathode and an anode instead of an organic electrolyte solution and other components are configured in a solid state has been developed.

The all-solid state battery as described above has been spotlighted as a next-generation battery capable of basically solving the safety problems as described above because the organic electrolyte solution is replaced with a solid electrolyte.

Meanwhile, in the all-solid state battery, it is important to compress the solid electrolyte to have a high density and to allow interfaces to face each other without gaps therebetween. The solid electrolyte may have a small area, but in the case of attempting to increase an area of the solid electrolyte, it may also be difficult to uniformly compress the solid electrolyte.

Further, the solid electrolyte has been manufactured using a wet process in order to mass-produce the all-solid state battery, but in this case, when a thick film is coated on a composite electrode (a cathode composite electrode or anode composite electrode), the thick film may not be formed to have a uniform amount and thickness.

Further, since empty spaces (pores) are formed due to shapes of the solid electrolyte and active material powders, movement of ions are impossible, such that there is a problem in performance.

The foregoing is intended merely to aid in the understanding of the background of the present invention, and is not intended to mean that the present invention falls within the purview of the related art that is already known to those skilled in the art.

SUMMARY

In preferred aspects, the present invention may provide an all-solid state battery comprising a composite electrode, and a method of manufacturing the same. Particularly, the composite electrode may be coated to have uniform thickness and pores or empty spaces between active material powders may be filled.

In one aspect of the present invention, provided is an all-solid state battery. The all-solid state battery may include a current collector comprising an electrode mixture that comprises an active material, a conductive material, a binder, and a nano-solid electrolyte, and a composite electrode comprising microcapsules. Preferably, the microcapsules may contain the slurry inside thereof and is configured to coat the slurry on the current collector. Suitably, the electrode mixture may be formed of a slurry.

The term "all-solid battery" as used herein refers to a battery or battery system that comprises all the components thereof in a solid state or a substantial solid state. For instance, the all-solid battery particularly includes a solid electrolyte that may be substantially solid such as a gel type, or a solid.

The term "active material" as used herein refers to a compound or composite comprising various components that can produce or store electrochemical or electric energy, i.e. electrons, during reversible or irreversible chemical reactions in a battery system. Preferably, the active material in the battery system, e.g. lithium-ion battery, may produce or store electrons via oxidation at an anode and reduction at a cathode. For instance, the anode active material can produce electrons by itself or by oxidation reaction with an electrolyte, and the cathode active material can store or absorb electrons supplied or transferred from an electrolyte or the anode.

The term "conductive material" as used herein refers to a compound or composite comprising various components that can freely transfer electrons or allow electric flow (current) due to substantially reduced resistance. Exemplary conductive material may include, but not limited to, metals, electrolytes, superconductors, semiconductors, plasmas, nonmetallic conductors such as carbon materials (e.g. graphite) and conductive polymers. A preferred conductive material in the invention may have a solid form, such as particle, fiber, nanotube and the like.

The term "binder" as used herein refers to an adhesive compound or component that binds solid components in a mixture, and the binder may have binding forces due to chemical properties on its surface. Preferably, the binder in the battery system can bind active materials, conductive materials, solid electrolyte and the like.

The term "nano-solid electrolyte" as used herein refers to an electrolyte formed in solid particles of electrolyte or conductive material. The solid particles may have a size ranging from about 1 to about 20 μm, which may be substantially reduced sizes compared to conventional solid electrolyte particles or powder.

The term "microcapsule" as used herein refers to a particle or a carrier vehicle that may have a size range in microscale. The microcapsule may have a spherical shape, oval shape or the like, but exemplary shapes of the microcapsules are not limited thereto. Preferred microcapsules may include an outer layer, e.g. outer coating layer and an inner portion that can accommodate other materials or substance, and a thickness of the coating layer or inner volume of the microcapsule may not be particularly limited.

The term "slurry" as used herein refers to a fluid mixture including solid components and liquid, such that the slurry can be distinguished from a solid. An amount of the solid components may be controlled to adjust concentration or viscosity or thickness thereof. A preferred slurry in the present invention may have a suitable viscosity such that the slurry may behave like a gel. An alternate slurry may include high content of the solid components, for instance, greater than about 50 wt %, greater than about 60 wt %, greater than about 70 wt %, greater than about 80 wt %, or greater than about 90 wt %, based on the total weight of the slurry. Moreover, a preferred slurry suitably may have a viscosity of about 500 to about 3000 cPs, 500 to about 2000 cPs, or particularly of about 800 to 1200 cPs.

The composite electrode may include a composite cathode comprising a cathode active material, the conductive material, the binder, the solid electrolyte, and the microcapsules including a solid electrolyte.

The microcapsule may comprise a first microcapsule comprising a cathode active material, the conductive material, the binder, and the slurry and a second microcapsule comprising an anode active material, the conductive material, the binder, and the slurry.

The composite electrode may comprise a composite cathode coated with the first microcapsule and a composite anode coated with the second microcapsule.

The microcapsules may comprise a solid electrolyte layer that comprises a conductive polymer material and forms an outer layer of the microcapsules. Preferably, the slurry may be formed in a gel-type or a solid and is present inside of the microcapsules.

In the microcapsule, the solid electrolyte layer may be ruptured at a predetermined temperature, such that the nano-solid electrolyte from the slurry inside the microcapsule fills empty spaces in an electrode.

A diameter ratio of the microcapsule to active materials of the composite cathode or the composite anode suitably may be about 1:1 to 10:1.

A diameter of the nano-solid electrolyte suitably may be about 1 to 20 μm.

In another aspect, provided is a method of manufacturing an all-solid state battery as described herein. The method may comprise: impregnating the microcapsule with a solid electrolyte; preparing a slurry comprising the active material, the conductive material, the binder, and the nano-solid electrolyte; adding the microcapsules to the prepared slurry; and performing a rolling process for supplying the nano-solid electrolyte in the microcapsules into empty spaces generated between interfaces of the microcapsules.

The microcapsule may be added in an amount of about 0.1 to 30% based on the weight of the composite electrode.

The binder may be formed in a solid form, and comprise one selected from the group consisting of powder type Super P, rod shaped Denka, and vapor-grown carbon fiber (VGCF).

The binder suitably may include a polymer compound comprising a fluorine component, diene component, acrylic component, or silicon.

The method may further comprising injecting a mixture of the active material, the conductive material, the binder, and the nano-solid electrolyte into an organic solvent and mixing thereof to prepare the slurry uniformly dispersed.

Preferably, the slurry may be formed to have a viscosity of about 800 to 1200 cPs for coating the microcapsules.

The organic solvent may be an aromatic hydrocarbon based non-polar solvent.

The anode active material may comprise natural graphite, artificial graphite, soft carbon, or hard carbon.

In particular, the solid electrolyte in the microcapsule may be formed in the outer layer of the microcapsules and be ruptured at a predetermined temperature. The nano-solid electrolyte may be released from the microcapsule and fill empty spaces in an electrode of the all-solid state battery.

Further provided is a vehicle comprising the all-solid state battery as described herein.

Other aspects of the invention are disclosed infra.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
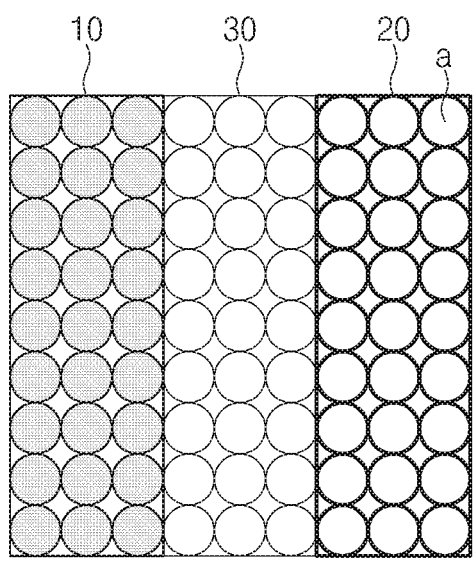
FIG. 1 illustrates pores or empty spaces generated in an electrode of an all-solid state battery in the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Advantages and features of the present invention and methods to achieve them will be elucidated from exemplary embodiments described below in detail with reference to the accompanying drawings. However, the present invention is not limited to the preferred embodiment disclosed herein but will be implemented in various forms. Various preferred embodiments make disclosure of the present inventions thorough and are provided so that those skilled in the art can easily understand the scope of the present invention. Therefore, the present invention will be defined by the scope of the appended claims. Like reference numerals throughout the specification denote like elements.

Hereinafter, exemplary embodiments of the present invention will be described with reference to the accompanying drawings for describing a lithium secondary battery and a method of manufacturing the same.

Figure 2:
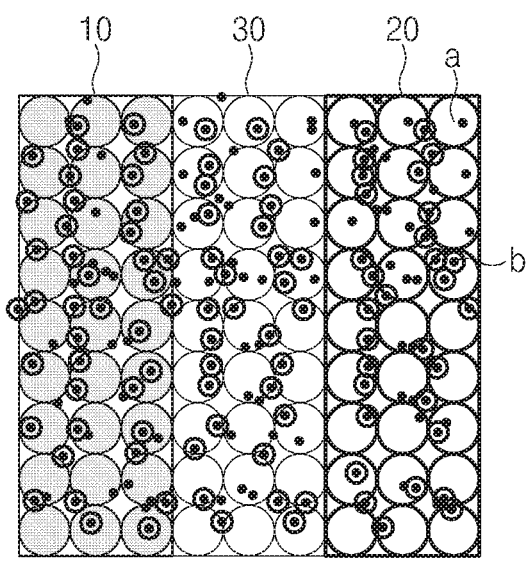
FIG. 2 illustrates that pores or empty spaces of an exemplary electrode according to an exemplary embodiment of the present invention are filled with a solid electrolyte.
Figure 3:
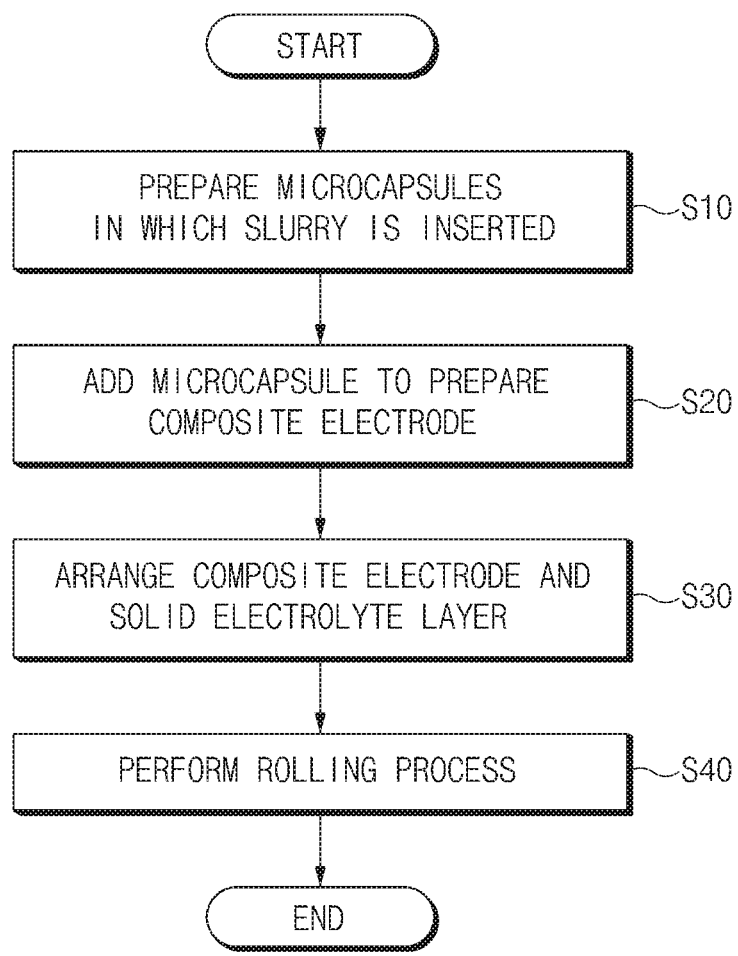
FIG. 3 is a flow chart illustrating an exemplary method of manufacturing an exemplary all-solid state battery.

FIG. 1 illustrates pores or empty spaces generated in an electrode of an all-solid state battery, FIG. 2 illustrates, according to an exemplary embodiment of the present invention, pores or empty spaces of an exemplary electrode of the present invention. In particular, the pores and the empty spaces may be filled with a solid electrolyte, and FIG. 3 is a flow chart illustrating a method of manufacturing an all-solid state battery.

Some embodiments of an all-solid state battery for a vehicle and a method of manufacturing the same may be changed by those skilled in the art, and in the present exemplary embodiment, the all-solid state battery and the method of manufacturing the same are a lithium secondary battery and a method of manufacturing the same, respectively.

First, a secondary battery will be briefly described. Since in an electrode according to the present invention, stable binding between an electrode mixture and a current collector may be implemented and amounts of a binder and a conductive material contained in the electrode mixture may be minimized, thereby providing a high-capacity and high-power secondary battery.

An exemplary anode according to the present invention may contain, for example, i) carbon and graphite materials such as natural graphite, artificial graphite, expanded graphite, carbon fiber, non-graphitizable carbon, carbon black, carbon nanotube, fullerene, activated carbon, and the like; metals alloyable with lithium such as Al, Si, Sn, Ag, Bi, Mg, Zn, In, Ge, Pb, Pd, Pt, Ti, and the like, or compounds containing these elements; composites of the metal and the compound with the carbon and graphite materials; or iv) lithium-containing nitrides, as an anode active material.

However, the anode active material is not limited thereto, but may be one or a combination of two or more selected from the group consisting of crystalline carbon, amorphous carbon, a silicon based active material, a tin based active material, and a silicon-carbon based active material. In addition, the anode may further contain a binder, a conductive material, and other additives, which are generally contained in an anode, in addition to the anode active material. Specific examples, contents, and the like, of the binder, the conductive material, and other additives are not limited in a range in which the binder, the conductive material, and other additives are generally added to the anode.

Further, the secondary battery may include a non-aqueous electrolyte solution containing a lithium salt that may be impregnated into an electrode assembly and the electrode assembly may include a separator interposed between an anode and a cathode.

The separator may be interposed between the cathode and the anode, and an insulating thin film having high ion permeability and mechanical strength may be suitably used. A pore diameter of the separator suitably may range from about 0.01 to about 10 μm, and a thickness thereof suitably may range from about 5 to about 300 μm.

As an example of the separator as described above, a chemical resistant and hydrophobic separator made of an olefin based polymer such as polypropylene, or the like; a sheet or non-woven fabric made of glass fiber, polyethylene, or the like; Kraft paper, or the like, suitably may be used. For example, Celgard separators (CELGARD™ 2400, 2300), a polypropylene separator, a polyethylene based separator, and the like may be used as the separator in the present invention.

Meanwhile, in order to increase safety of the battery, a gel polymer electrolyte may be coated on the separator. Representative examples of the gel polymer as described above may include polyethylene oxide, polyvinylindene fluoride, polyacrylonitrile, and the like. In the case in which a solid electrolyte such as a polymer, or the like, is used as an electrolyte, the solid electrolyte may also serve as both the separator and the solid electrolyte.

In an exemplary embodiment, the cathode active material of the present disclosure may include a layered compound such as lithium cobalt oxide ($LiCoO_2$), lithium nickel oxide ($LiNiO_2$), or the like, or compounds substituted with one or more transition metals; lithium manganese oxides represented by Chemical Formula $Li_{1+x}Mn_{2-x}O_4$ (here, x is 0 to about 0.33), $LiMnO_3$, $LiMn_2O_3$, $LiMnO_2$, or the like; lithium copper oxide ($Li_2CuO_2$); vanadium oxides such as $LiV_3O_8$, $LiFe_3O_4$, $V_2O_5$, $Cu_2V_2O_7$, or the like; Ni-site type lithium nickel oxides of Chemical Formula $LiNi_{1-x}M_xO_2$ (here, M is Co, Mn, Al, Cu, Fe, Mg, B, or Ga, and x is about 0.01 to 0.3); lithium manganese composite oxides represented by Chemical Formula $LiMn_{2-x}M_xO_2$ (here, M is Co, Ni, Fe, Cr, Zn, or Ta, and x is about 0.01 to 0.1) or $Li_2Mn_3MO_8$ (M is Fe, Co, Ni, Cu, or Zn); $LiMn_2O_4$ wherein a portion of Li is substituted with alkaline earth metal ions; disulfide compounds; $Fe_2(MoO_4)_3$; and the like.

However, the cathode active material is not limited thereto. Preferably, the cathode active material may be a lithium cobalt oxide, a lithium manganese oxide, a lithium nickel oxide, a lithium manganese-cobalt-nickel oxide, or a composite of two or more thereof.

The current collector as used herein refers to a current collector of at least one of the cathode and the anode, but may be preferably a cathode current collector. In the current collector, movement or transfer of electrons occurs due to an electrochemical reaction of the active material. Typically, material having conductivity without causing an chemical change in a battery may be used as the current collector without particular limitation. Preferably, the current collector may include copper, stainless steel, aluminum, nickel, titanium, fired carbon, or copper, aluminum or stainless steel surface-treated with carbon, nickel, titanium, silver, or the like, an aluminum-cadmium alloy, and the like.

Meanwhile, a metal layer coated on the cathode current collector may have a structure in which a reaction group capable of forming a self-assembled monolayer as described above may be present at the outside of metal particles. For instance, when a metal of the current collector is treated with a solution in which the metal particles including the reaction group may form the self-assembled monolayer are dispersed in water or an organic solvent, the self-assembled monolayer may be entirely or partially formed on the current collector, and the electrode mixture may be applied onto the self-assembled monolayer.

The solvent for forming the self-assembled monolayer containing a metal, may preferably be, one or more selected from the group consisting of distilled water, ethanol, acetonitrile, and acetone. In particular, the solvent may be prepared as an aqueous solution using distilled water.

Since, in the current collector according to the present invention, the self-assembled monolayer containing a metal is not necessarily formed on the entire surface of the current collector, but may be entirely or partially coated on the surface of the current collector, the self-assembled monolayer may be suitably adjusted in a range in which binding strength with the electrode mixture and electrical conductivity are improved. However, when a thickness of the self-assembled monolayer containing a metal is less than the predetermined value, electrical conductivity may be improved. Moreover, when a length of an organic material of the monolayer is less than the predetermined value, a self-assembled monolayer may not be sufficiently formed. Accordingly, it is preferable to suitably adjust the length of the organic material.

A cathode mixture may contain the cathode active material, the conductive material, and the binder, and selectively further contain other components such as a viscosity modifier, a filler, a crosslinking accelerator, a coupling agent, an adhesion promoter, and the like.

A lithium secondary battery includes a non-aqueous electrolyte solution containing a lithium salt impregnated into an electrode assembly that includes a separator interposed between an anode and a cathode.

The separator is interposed between the cathode and the anode, and an insulating thin film having high ion permeability and mechanical strength may be used. A pore diameter of the separator suitably may be about 0.01 to 10 μm, and a thickness thereof suitably may be 5 to 300 μm. For example, the separator may be a chemical resistant and hydrophobic separator including an olefin based polymer such as polypropylene, or the like; a sheet or non-woven fabric made of glass fiber, polyethylene, or the like; Kraft paper, or the like.

The non-aqueous electrolyte containing a lithium salt may include an non-aqueous electrolyte and the lithium salt. As a non-aqueous electrolyte, a non-aqueous electrolyte solution, a solid electrolyte, an inorganic solid electrolyte, or the like, may be used.

For example, the non-aqueous electrolyte solution may be an aprotic organic solvent such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3,dioxene, diethyl ether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

The binder as used herein may be a component assisting in binding the active material to the conductive material, and the like, and to the current collector. The binder may be suitably added in an amount of about 1 to 50 wt % based on a total weight of the electrode mixture. Examples of the binder may include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoro ethylene, polyethylene, polypropylene, an ethylene-propylene-diene polymer (EPDM), sulfonated EPDM, styrene-butadiene rubber, fluoro-rubbers, and various copolymers thereof, and the like.

In other embodiments, the binder may include any one of polyurethane and polyvinylidene difluoride (PVDF).

The conductive material as used herein may include any one of graphene (Gr.), acetylene black, carbon black, vapor grown carbon fiber (VGCF), and Gr.+ A.B may be used. The conductive material (b) may be the same or different material from the binder (a), however, a different kind of binder (a) of which a solvent is different such as a water based solvent, an oil based solvent, or the like, may also be used.

Further, the conductive material as used herein refers to a component for further improving conductivity of an electrode active material. The conductive material may be added in an amount of about 1 to 20 wt % based on the total weight of the electrode mixture. Any conductive material having suitable conductivity without causing chemical changes in the battery may be used without particular limitation. Examples of the conductive material may include graphite such as natural graphite, artificial graphite, or the like; carbon blacks such as carbon black, acetylene black, Ketjen black, channel black, furnace black, lamp black, thermal black, and the like; conductive fibers such as carbon fibers, metallic fibers, and the like; metallic powders such as carbon fluoride powder, aluminum powder, nickel powder, and the like; conductive whiskers such as zinc oxide, potassium titanate, and the like; conductive metal oxides such as titanium oxide, and the like; polyphenylene derivatives, and the like.

A preferable battery for a vehicle may be modified or varied by those skilled in the art, and in the present exemplary embodiment, the battery is the all-solid state battery.

FIG. 1 illustrates pores or empty space generated in an electrode of an all-solid state battery, FIG. 2 illustrate the pores or the empty spaces of the electrode of FIG. 1 are filled with a solid electrolyte, and FIG. 3 is a flow chart illustrating an exemplary method of manufacturing an all-solid state battery.

The all-solid state battery according to the present invention will be described with reference to FIGS. 1 and 3. The all-solid state battery includes a current collector comprising the electrode mixture, and a composite electrode including microcapsules. The electrode mixture may be formed in a slurry comprising an active material, a conductive material, a binder, and a nano-solid electrolyte. The microcapsules may contain the electrode mixture in the slurry configured to coat the slurry on the current collector. The nano-solid electrolyte and the solid electrolyte may have the same or different component to each other, however, those may be different in size thereof. For instance, the diameter of the nano-solid electrolyte may suitably range from about 1 to about 20 μm. In the present invention, the nano-solid electrolyte and the solid electrolyte should not be considered as different materials from each other.

The composite electrode may include a composite cathode 10, a composite anode 20, and microcapsules. The composite cathode 10 may comprise the cathode active material, the conductive material, the binder, the solid electrolyte, and the microcapsules. In particular, the microcapsules may include the nano-solid electrolyte. The a composite anode 20 may include the anode active material, the conductive material, the binder, the solid electrolyte, and the microcapsules (a) including the nano-solid electrolyte. The composite solid electrolyte layer 30 may be configured by impregnating the microcapsules with the solid electrolyte. Preferably, a diameter ratio of the solid electrolyte to the microcapsule in the solid electrolyte layer 30 may range from about 1:2 to about 5:1.

In the microcapsule (a), an outer layer may be formed of a conductive polymer material, and gel-type or high-solid content slurry may be included inside the microcapsule (a). The microcapsule (a) may be a first microcapsule in which the cathode active material, the conductive material, the binder, the slurry may be accommodated and a second microcapsule in which the anode active material, the conductive material, the binder, and the slurry may be accommodated. The first microcapsule may be provided in the composite cathode 10, and the second microcapsule may be provided in the composite anode 20.

The nano-solid electrolyte in the microcapsule (a) may pass through a solid electrolyte layer that may be ruptured at a predetermined temperature, and thus may fill empty spaces (pores) in the all-solid state battery. As consequence, ions may be smoothly conducted. The microcapsule may be ruptured or melted at a temperature of about 100 to 150° C. Preferably, the solid electrolyte layer may include a conductive polymer having a melting point of about 100 to 150° C.

Here, a diameter ratio of the microcapsule (a) to active materials of the composite cathode 10 and the composite anode 20 is not limited, but may range, preferably, from about 1:1 to about 10:1. Lithium ion conductivity of the microcapsule a in the electrolyte may be of about $10^{-4}$ S/cm or greater.

The all-solid state battery according to the present invention and the method of manufacturing the same configured as described above will be described.

FIG. 1 illustrates pores or empty spaces generated in an electrode of an all-solid state battery, FIG. 2 illustrates the pores or the empty spaces in the electrode of FIG. 1 filled with a solid electrolyte, and FIG. 3 is a flow chart illustrating an exemplary method of manufacturing an exemplary all-solid state battery according to an exemplary embodiment.

The method of manufacturing an all-solid state battery according to the present invention will be described with reference to FIGS. 2 and 3. A solid electrolyte layer 30 may be formed by impregnating microcapsules (a) including a slurry and a solid electrolyte (S10). Here, the slurry may be formed in a gel type slurry or nano-solid electrolyte (b). This slurry, a cathode active material, electrolyte powder, carbon conductive material powder or graphite based conductive material powder, and a binder for binding in an electrode may be mixed with each other, thereby preparing cathode slurry.

At the time of preparing the cathode slurry, after mixing starting powders of lithium sulfide ($Li_2S$), which is an amorphous sulfide solid electrolyte, and $P_2S_5$ at a predetermined ratio (e.g. about 75:25), an electrolyte material (powder) may be obtained using a high energy milling method. the milling process may be is performed in a glove box under a nitrogen atmosphere to avoid contact with air.

Meanwhile, an anode slurry may be obtained by sufficiently mixing an anode active material, electrolyte powder, carbon conductive material powder or graphite based conductive material powder, and a binder for binding in an electrode at a predetermined composition ratio (e.g. about 70:30:5:5), similarly to the cathode slurry.

Next, the slurry may be mixed with the binder for binding in the electrode, and the microcapsules may be added thereto within a predetermined range based on the total weight of a composite electrode (S20). In addition, the solid electrolyte and the binder may be mixed at a predetermined ratio (e.g. about 90:10), similarly to a case of preparing the cathode slurry.

$LiNi_xCo_yMn_zO_2$ based cathode active material powder, the electrolyte powder obtained under the condition as described above, the carbon conductive powder, and the binder for binding in an electrode may be sufficiently mixed at a predetermined ratio. The cathode active material powder, the electrolyte powder, the carbon conductive powder, and the binder suitably may be mixed at a composition ratio of about 70:30:5:5. The microcapsules (a) may be added in an amount of about 0.1 to 30% based on the total weight of the composite electrode.

Further, a binder solution may be prepared to have a solid content of about 20% or greater. The binder may include powder-type super P, rod shaped Denka, or vapor grown carbon fiber (VGCF). Alternatively, the binder may be a polymer compound comprising a fluorine component, diene component, acrylic component, or silicon component.

Composites obtained as described above may be injected into an organic solvent, and mixed, thereby obtaining uniformly dispersed slurry (S30). A solid content suitably may be adjusted to provide a viscosity of about 800 to 1200 cPs for coating the microcapsules. Further, as the organic solvent, an aromatic hydrocarbon based non-polar solvent suitably may be used.

Here, as the binder, powder-type super P, rod shaped Denka, or vapor grown carbon fiber (VGCF) is used. Alternatively, the binder may be a polymer compound including a fluorine component, diene component, acrylic component, or silicon component.

The composites may be injected into the organic solvent and mixed for a predetermined time, thereby to obtain uniformly dispersed slurry. The solid content may be adjusted to a suitable viscosity for coating, and a preferable viscosity may be range from about 800 to 1200 cPs.

Next, the composite cathode, the solid electrolyte layer 30 containing the microcapsules, and the composite anode prepared as described above may be coated to provide desired thicknesses, respectively (S30). A cathode substrate, the composite cathode, the solid electrolyte 30, the composite anode, and an anode substrate may be sequentially arranged and rolled at a temperature of about 100 to 150° C., thereby manufacturing an all-solid state battery (one set).

Next, the method may include a rolling process for allowing the nano-solid electrolyte (b) in the microcapsules (a) to be supplied between empty spaces generated between interfaces (S40). As the anode active material, carbon based materials such as natural graphite, artificial graphite, soft carbon, and hard carbon may be provided.

Here, as a material for the solid electrolyte, currently reported inorganic solid electrolytes having a crystalline or amorphous structure such as $Li_3N$, LISICON (Lithium Super Ionic Conductor), LIPON ($Li_{3+y}PO_{4-x}N_x$), Thio-LISICON ($Li_{3.25}Ge_{0.25}P_{0.75}S_4$), $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, and $Li_2O$—$Al_2O_3$—$TiO_2$—$P_2O_5$ (LATP), oxide based materials, or sulfide based materials may be used. The lithium ion conductivity in the solid electrolyte of the present invention may be $10^{-4}$ S/cm or greater.

As the organic solvent, cycloaliphatic hydrocarbons such as cyclopentane, cyclohexane, and the like, or aromatic hydrocarbons such as toluene, xylene, and the like, suitably may be used. For instance, a mixture comprising two or more of these solvents may be suitably selected and used in consideration of a drying rate or an environment. When the sulfide based electrolyte is used according to an exemplary embodiment of in the present invention, an aromatic hydrocarbon based non-polar solvent may be preferable due to its chemical reactivity.

Here, the microcapsule according to the present invention may be added as much as needed in a range of about 0.1 to 30% based on the total weight of the composite electrode. As the anode active material, carbon based materials such as natural graphite, artificial graphite, soft carbon, and hard carbon may be used. A mixing process condition may be similar to that of a cathode slurry mixing process as described herein.

Meanwhile, preparation of solid electrolyte slurry will be described. The solid electrolyte may be mixed similarly to preparation of the electrode slurry, but the solid electrolyte and the binder may be mixed at a predetermined ratio, for example, of about 90:10. Here, the microcapsule according to the present invention may be added as much as needed in a range of about 0.1 to 30% based on the weight of the composite electrode. Preferably, a binder solution may be prepared so as to have a solid content of about 20% or greater.

According to various exemplary embodiments of a lithium secondary battery and a method of manufacturing the same, the nano-solid electrolyte in the microcapsules may fill in the pores during the rolling process, such that ion conductivity of the electrode may be improved, and the solid electrolyte layer of the microcapsule may be ruptured or damaged during the rolling process, such that the nano-solid electrolyte may move between the pores.

The lithium secondary battery and the method of manufacturing the same according to the exemplary embodiments are not limited to configurations and methods as described above, but selectively, each of the exemplary embodiments may be entirely or partially combined so that the exemplary embodiments may be variously modified.

As described above, according to the exemplary embodiments of the present invention, the all-solid state battery and the method of manufacturing the same may provide one or more of the following advantageous effects.

First, with the all-solid state battery and the method of manufacturing the same according to the present invention, the pores or empty spaces in the electrodes may be filled with the nano-solid electrolyte in the microcapsules during a rolling process, such that ion conductivity of the electrode may be improved.

Second, with the all-solid state battery and the method of manufacturing the same according to the present invention, a solid electrolyte layer of the microcapsule may be ruptured or damaged in a rolling process, such that the nano-solid electrolyte may move between the pores.

The effects of the present invention are not limited to the above-mentioned effects, and other effects that are not mentioned will be clearly understood by those skilled in the art through the accompanying claims.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A method of manufacturing an all-solid state battery, the method comprising:
   preparing a slurry comprising a nano-solid electrolyte;
   preparing a cathode slurry comprising the slurry, a cathode active material, a conductive material, and a binder;
   preparing an anode slurry comprising the slurry, an anode active material, the conductive material, and the binder;
   impregnating microcapsules containing the slurry inside with a solid electrolyte to form a solid electrolyte layer;
   adding other microcapsules to the cathode slurry and the anode slurry to prepare a composite electrode comprising a composite cathode and a composite anode; and
   performing a rolling process on the solid electrolyte layer to damage the microcapsules of the solid electrolyte layer for supplying the nano-solid electrolyte in the microcapsules into empty spaces between interfaces of adjacent microcapsules.

2. The method according to claim 1, wherein the other microcapsule are added in an amount of about 0.1 to 30% based on the weight of the composite electrode to the cathode slurry and the anode slurry to prepare the composite electrode.

3. The method according to claim 2, wherein the binder is formed in a solid form, and comprises one selected from the group consisting of powder type Super P, rod shaped Denka, and vapor-grown carbon fiber (VGCF).

4. The method according to claim 3, wherein the binder comprises a polymer compound comprising a fluorine component, diene component, acrylic component, or silicon component.

5. The method according to claim 3, further comprising injecting a mixture of the cathode or anode active material, the conductive material, the binder, and the nano-solid electrolyte into an organic solvent and mixing thereof to prepare the cathode or anode slurry uniformly dispersed, wherein the slurry is formed to have a viscosity of about 800 to 1200 cPs for coating the microcapsules.

6. The method according to claim 5, wherein the organic solvent is an aromatic hydrocarbon based non-polar solvent.

* * * * *